E. F. HUTCHINS.
STENCH-TRAP.
No. 178,059. Patented May 30, 1876.
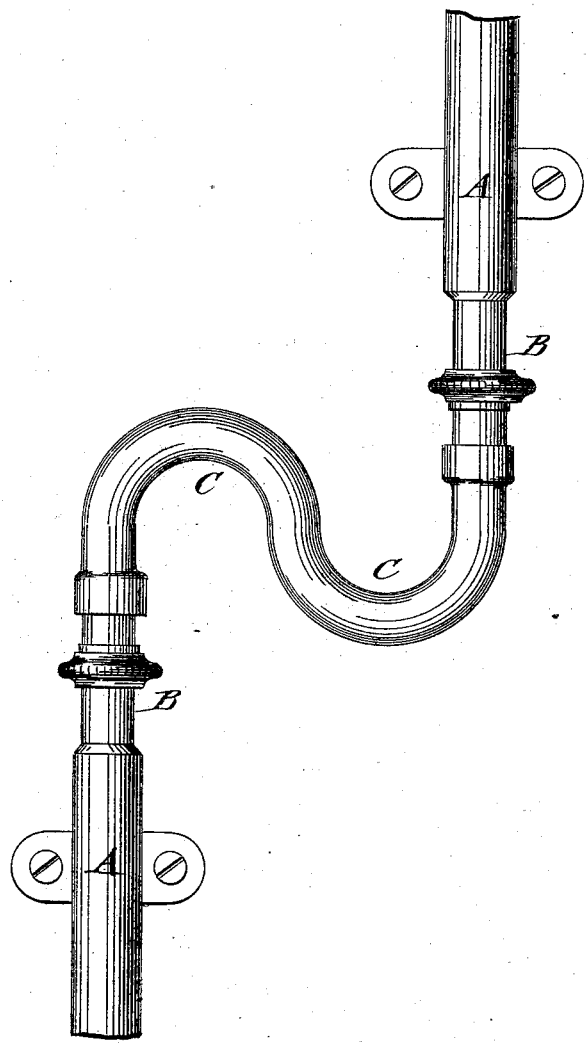

UNITED STATES PATENT OFFICE.

EDWARD F. HUTCHINS, OF TORONTO, CANADA.

IMPROVEMENT IN STENCH-TRAPS.

Specification forming part of Letters Patent No. 178,059, dated May 30, 1876; application filed March 21, 1876.

*To all whom it may concern:*

Be it known that I, EDWARD F. HUTCHINS, of York Chambers, Toronto, Canada, have invented a new and Improved Stench-Trap, of which the following is a specification:

The accompanying drawing represents a side view of my improved stench-trap.

The object of my invention is to so improve the metallic stench-trap in common use that the bursting of the same by freezing is avoided, and that the detaching of the trap for cleaning or melting the ice may be readily accomplished.

The invention consists of a stench-trap made of an elastic material, connected in detachable manner to the pipes.

In the drawing, A represents the common drain-pipes, which are connected by brass or other unions or joints B with a stench-trap, C, that is made of the usual S form, to prevent the smell arising from the main drain and sewers from passing beyond the trap. The stench-trap C is made of india-rubber, or other elastic material which is not liable to burst when the water is converted at any time into ice, as is the case of the common lead, iron, or other traps. The elasticity of the trap prevents bursting, and keeps the same in working order in cold weather, the unions or joints B admitting the ready taking off of the elastic trap for clearing out dirt, or melting the ice formed in it, or for the purpose of recovering any article which may accidentally have been taken down the drain-pipe. The choking up of the trap by sediment is also avoided by the convenient access to the same, so that a number of disadvantages of metallic traps are thereby avoided.

Having thus described my invention, I claim as new and desire to secure by Letters Patent—

An S-shaped stench-trap, C, made detachable, and of elastic material, to allow the formation of ice on the inside without fracture, and its ready removal without delay.

ED. F. HUTCHINS.

Witnesses:
    HENRY COOLEY,
    MANCEL WILLMOT.